US007008485B2

(12) United States Patent
Heikkila et al.

(10) Patent No.: US 7,008,485 B2

(45) **Date of Patent: *Mar. 7, 2006**

(54) SEPARATION PROCESS

(75) Inventors: Heikki Heikkila, Espoo (FI); Mika Manttari, Lappeenranta (FI); Marianne Nystrom, Lappeenranta (FI); Mirja Lindroos, Kirkkonummi (FI); Hannu Paananen, Kantvik (FI); Outi Puuppo, Espoo (FI); Hannu Koivikko, Kantvik (FI)

(73) Assignee: Danisco Sweeteners Oy, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 10/451,859

(22) PCT Filed: Dec. 28, 2001

(86) PCT No.: PCT/FI01/01155

§ 371 (c)(1), (2), (4) Date: Jun. 25, 2003

(87) PCT Pub. No.: WO02/053781

PCT Pub. Date: Jul. 11, 2002

(65) Prior Publication Data

US 2004/0060868 A1 Apr. 1, 2004

(30) Foreign Application Priority Data

Dec. 28, 2000 (FI) .................................. 20002865
Dec. 28, 2000 (FI) .................................. 20002866

(51) Int. Cl.
*C13D 3/16* (2006.01)
*B01D 37/00* (2006.01)

(52) U.S. Cl. ........................ 127/55; 210/787; 210/788; 210/767; 210/808

(58) Field of Classification Search .................. 127/55; 210/787, 788, 808, 767
See application file for complete search history.

(56) References Cited

U.S. PATENT DOCUMENTS

| | | | | |
|---|---|---|---|---|
| 4,511,654 | A | 4/1985 | Rohrbach et al. | |
| 4,631,129 | A | 12/1986 | Heikkila | |
| 5,637,225 | A | 6/1997 | Heikkila et al. | |
| 5,730,877 | A | 3/1998 | Heikkila et al. | |
| 5,853,487 | A | 12/1998 | Tang et al. | |
| 5,869,297 | A | 2/1999 | Binder et al. | |
| 6,126,754 | A | 10/2000 | Duflot | |
| 6,692,577 | B1 * | 2/2004 | Heikkila et al. | 127/34 |

FOREIGN PATENT DOCUMENTS

| | | |
|---|---|---|
| EP | 452 238 A3 | 10/1991 |
| WO | WO 96/27028 | 9/1996 |
| WO | WO 99/28490 | 6/1999 |
| WO | WO 99/28490 A | 6/1999 |

OTHER PUBLICATIONS

Johan Gullichsen, et al. "Paper Making Science and Technology" Book 3, Forest Products, Chapter 2 pp. 59 and 86, no date provided.

* cited by examiner

*Primary Examiner*—David Brunsman
(74) *Attorney, Agent, or Firm*—Scully, Scott, Murphy & Presser

(57) ABSTRACT

The invention relates to a process of separating compounds with a small molar mass from compounds having a molar mass less than 1.9 times that of the compounds with a small molar mass using nanofiltration. The compounds with a small molar mass have a typical molar mass less than 250 g/mol. In one embodiment of the invention, pentose sugars are separated from hexose sugars. The invention can be applied to the recovery of xylose from spent liquors and to the recovery of betaine from sugar beet pulp extracts, for example.

66 Claims, No Drawings

SEPARATION PROCESS

This application is a 371 of PCT/FI01/01155, filed 28 Dec. 2001.

BACKGROUND OF THE INVENTION

The invention relates to a novel process of separating chemical compounds having a small molar mass from compounds having only a slightly larger molar mass, typically a molar mass less than 1.9 times that of the compounds with a small molar mass. The process of the invention is based on the use of nanofiltration. The invention can be applied to recovering xylose from biomass hydrolysates, such as from a spent liquor obtained from a pulping process, typically from a sulphite pulping process, for example. The invention can also be applied to the recovery of betaine from biomass extracts, such as from a sugar beet pulp extract.

Nanofiltration is a relatively new pressure-driven membrane filtration process, falling between reverse osmosis and ultrafiltration. Nanofiltration typically retains large and organic molecules with a molar mass greater than 300 g/mol. The most important nanofiltration membranes are composite membranes made by interfacial polymerisation. Polyether sulfone membranes, sulfonated polyether sulfone membranes, polyester membranes, polysulfone membranes, aromatic polyamide membranes, polyvinyl alcohol membranes and polypiperazine membranes are examples of widely used nanofiltration membranes. Inorganic and ceramic membranes can also be used for nanofiltration.

It is known in the art to use nanofiltration for separating monosaccharides, such as glucose and mannose from disaccharides and higher saccharides. The starting mixture including monosaccharides, disaccharides and higher saccharides may be a starch hydrolysate, for example.

U.S. Pat. No. 5,869,297 (Archer Daniels Midland Co.) discloses a nanofiltration process for making dextrose. This process comprises nanofiltering a dextrose composition including as impurities higher saccharides, such as disaccharides and trisaccharides. A dextrose composition having a solids content of at least 99% dextrose is obtained. Cross linked aromatic polyamide membranes have been used as nanofiltration membranes.

WO 99/28490 (Novo Nordisk AS) discloses a method for enzymatic reaction of saccharides and for nanofiltration of the enzymatically treated saccharide solution including monosaccharides, disaccharides, trisaccharides and higher saccharides. Monosaccharides a,a obtained in the permeate, while an oligosaccharide syrup containing disaccharides and higher saccharides is obtained in the retentate. The retentate including the disaccharides and higher saccharides is recovered. A thin film composite polysulfone membrane having a cut-off size less than 100 g/mol has been used as the nanofiltration membrane, for example.

U.S. Pat. No. 4,511,654 (UOP Inc.) relates to a process for the production of a high glucose or maltose syrup by treating a glucose/maltose-containing feedstock with an enzyme selected from amyloglucosidase and β-amylase to form a partially hydrolyzed reaction mixture, passing the resultant partially hydrolyzed reaction mixture through an ultrafiltration membrane to form a retentate and a permeate, recycling the retentate to the enzyme treatment stage, and recovering the permeate including the high glucose or maltose syrup.

U.S. Pat. No. 6,126,754 (Roquette Freres) relates to a process for the manufacture of a starch hydrolysate with a high dextrose content. In this process, a starch milk is subjected to enzymatic treatment to obtain a raw saccharified hydrolysate. The hydrolysate thus obtained is then subjected to nanofiltering to collect as the nanofiltration permeate the desired starch hydrolysate with a high dextrose content.

It is also known to use membrane techniques, such as ultrafiltration to purify spent sulphite pulping liquors for recovering xylose (e.g. Papermaking Science and Technology, Book 3: Forest Products Chemistry, p. 86, ed., Johan Gullichsen, Hannu Paulapuro and Per Stenius, Helsinki University of Technology, published in cooperation with the Finnish Paper Engineer's Association and TAPPI, Gummerus, Jyväskylä, Finland, 2000). Xylose is produced in large amounts in pulp industry, for example in the sulphite cooking of hardwood raw material. In addition to xylose, the spent sulphite pulping liquors contain, as typical components, lignosulphonates, sulphite cooking chemicals, xylonic acid, oligomeric sugars, dimeric sugars and monosaccharides (other than the desired xylose), and carboxylic acids, such as acetic acid, and uronic acids. High-molar-mass lignosulphonates can thus be separated by ultrafiltration from the low-molar-mass components, such as xylose.

It is thus known to use ultrafiltration to separate compounds having a large molar mass, such as lignosulphonates present in a sulphite spent liquor, from compounds having a small molar mass, such as xylose, whereby compounds having a large molar mass (lignosulphonates) are separated into the retentate and compounds having a small molar mass (xylose) are enriched into the permeate. Further enriching of xylose from e.g. salts is possible for example with chromatographic methods using ion exclusion.

Separation of xylose from other monosaccharides, such as glucose by membrane techniques has not been disclosed in the state of the art.

Xylose has been typically recovered by crystallization e.g. from xylose-containing solutions of various origin and purity. Before crystallization, it is as a rule necessary to purify the xylose-containing solution obtained as a result of the hydrolysis of cellulosic material to a required degree of purity by various methods, such as filtration to remove mechanical impurities, ultrafiltration, ion-exchange, decolouring, ion exclusion or chromatography or combinations thereof.

Separation of xylose from such cooking liquors is described, for example, in U.S. Pat. No. 4,631,129 (Suomen Sokeri Oy). In this process, sulphite spent liquor is subjected to two-step chromatographic separation to form substantially purified fractions of sugars (e.g. xylose) and lignosulphonates. The first chromatographic fractionation is carried out using a resin in a divalent metal salt form, typically in a calcium salt form, and the second chromatographic fractionation is carried out using a resin in a monovalent salt form, such as a sodium salt form.

U.S. Pat. No. 5,637,225 (Xyrofin Oy) discloses a method for the fractionation of sulphite cooking liquor by a sequential chromatographic simulated moving bed system comprising at least two chromatographic sectional packing material beds, where at least one fraction enriched with monosaccharides and one fraction enriched with lignosulphonates is obtained. The material in the sectional packing material beds is typically a strongly acidic cation exchange resin in $Ca^{2+}$ form.

U.S. Pat. No. 5,730,877 (Xyrofin Oy) discloses a method for fractionating a solution, such as a sulphite cooking liquor, by a chromatographic separation method using a system comprising at least two chromatographic sectional packing beds in different ionic forms. The material of the sectional packing bed of the first loop of the process is essentially in a divalent cation form, such as in $Ca^{2+}$ form, and in the last loop essentially in a monovalent cation form, such as in $Na^{30}$ form.

WO 96/27028 (Xyrofin Oy) discloses a method for the recovery of xylose by crystallization and/or precipitation from solutions having a comparatively low xylose purity, typically 30 to 60% by weight of xylose on dissolved dry solids. The xylose solution to be treated may be, for example, a concentrate chromatographically obtained from a sulphite pulping liquor.

BRIEF SUMMARY OF THE INVENTION

The purpose of the invention is to provide a method of separating chemical compounds having a small molar mass from compounds having a molar mass less than 1.9 times that of the compounds with a small molar mass. The process of the claimed invention is based on the use of nanofiltration.

In accordance with the present invention, complicated and cumbersome chromatographic or ion-exhange steps can be completely or partly replaced by less complicated nanofiltration membrane techniques. The process of the invention provides a solution enriched in compounds with a small molar mass and essentially free from compounds with a molar mass less than 1.9 times that of the compounds with a small molar mass. In one embodiment of the invention, the invention provides a xylose solution enriched in xylose and free from conventional impurities of biomass hydrolysates, such as those present in a spent sulphite pulping liquor. In another embodiment of the invention, the invention provides a solution enriched in betaine and free from undesired monosaccharide components, such as glucose, erythritol and inositol.

A more detailed explanation of the invention is provided in the following description and appended claims.

DETAILED DESCRIPTION OF THE INVENTION

A detailed description of preferred embodiments of the invention will now be explained.

The invention relates to a process of separating compounds having a small molar mass from compounds having a molar mass less than 1.9 times that of the compounds with a small molar mass.

The invention is characterized by providing a starting solution comprising compounds with a small molar mass and compounds with a molar mass less than 1.9 times that of the compounds with a small molar mass, subjecting said solution to nanofiltration to obtain a fraction enriched in compounds with a small molar mass and a fraction enriched in compounds with a molar mass less than 1.9 times that of the compounds with a small molar mass, recovering a fraction enriched in compounds with a small molar mass, and optionally recovering a fraction enriched in compounds with a molar mass less than 1.9 times that of the compounds with a small molar mass.

The compounds with a small molar mass typically have a molar mass of up to 250, preferably up to 200 g/mol. The compounds with a small molar mass are typically selected from sugars, sugar alcohols, inositols, betaine, cyclodextrins, amino acids, uronic acids and carboxylic acids. Said sugars may be selected from ketose sugars and aidose sugars. The sugars may be in an anhydro form or in a deoxy form. Said sugar alcohols may be selected from hexitols, pentitols, tetritols etc. Said carboxylic acids may be selected from aldonic acids, for example gluconic acid.

The compounds with a molar mass less than 1.9 times that of the compounds with a small molar mass are compounds which have a slightly larger molar mass than the compounds with a small molar mass. In connection with the present invention, compounds with a molar mass less than 1.9 times that of the compounds with a small molar mass refer to compounds having a molar mass higher than that of the compounds with a small molar mass, but less than 1.9 times that of the compounds with a small molar mass.

The compounds with a molar mass less than 1.9 times that of the compounds with a small molar mass thus have a typical molar mass less than 475, preferably less than 380 g/mol. In a preferred embodiment of the invention, these compounds have a molar up to 1.5 times that of the compounds with a small molar mass, i.e. up to 375, and up to 300 g/mol, respectively.

Examples of sugars with a small molar mass comprise xylose and arabinose, which have a molar mass of 150.13 g/mol and which are pentose sugars. Examples of carboxylic acids comprise citric acid (192.13 g/mol) and lactic acid (90.08 g/mol), gluconic acid (196.16 g/mol) and glucuronic acid (194.14 g/mol).

Examples of sugars with a molar mass less than 1.9 times that of the compounds with a small molar mass are glucose (180.16 g/mol), galactose 180.16 g/mol), rhamnose (164.16 g/mol) and mannose (180.16 g/mol), which are hexose sugars.

In one embodiment of the invention, the compound with a small molar mass is betaine (117.15 g/mol) and the compounds to be separated from betaine are glucose (180.16 g/mol) and inositol (180.16 g/mol). In another embodiment of the invention, the compound to be separated from betaine is erythritol (122.12 g/mol).

The invention may also be applied to the separation of maltose (342.30 g/mol) from maltotriose (504.45 g/mol).

In a further embodiment of the invention, the invention may be applied to the separation of carboxylic acids from monosaccharides, such as ketose sugars, for example fructose (180.16 g/mol) and tagatose (180.16 g/mol).

In a typical embodiment of the invention, the fraction enriched in compounds having a small molar mass has a content of the same over 1.1 times, preferably over 1.5 times, and most preferably over 2.5 times that of the starting solution, based on the dry substance content. The fraction enriched in compounds having a small molar mass typically has a content of the same of or over 1.5 to 2.5 times that of the starting solution, based on the dry substance content.

In one embodiment of the invention, the fraction enriched in compounds with a small molar mass is recovered as the nanofiltration permeate and the fraction enriched in compounds with a molar mass less than 1.9 times that of the compounds with a small molar mass is recovered as the nanofiltration retentate.

In another embodiment of the invention, the fraction enriched in compounds with a small molar mass is recovered as the nanofiltration retentate and the compounds with amolar mass less than 1.9 times that of the compounds with a small molar mass are recovered as the nanofiltration permeate.

In one embodiment of the invention, the compounds with a small molar mass comprise pentose sugars and compounds with a molar mass of less than 1.9 times that of the compounds with a small molar mass comprise hexose sugars. Said pentose sugars typically comprise xylose and arabinose and said hexose sugars comprise glucose, galactose, rhamnose and mannose. The fraction enriched in pentose sugars is recovered as the nanofiltration permeate and the fraction enriched in hexose sugars is recovered as the nanofiltration retentate.

In another embodiment of the invention, the compound with a small molar mass is xylitol (152.15 g/mol) and the compound with a molar mass less than 1.9 times that of the compounds with a small molar mass is sorbitol (182.17 g/mol). The fraction enriched in xylitol is recovered as the nanofiltration permeate and the fraction enriched in sorbitol is recovered as the nanofiltration retentate.

In another embodiment of the invention, the compound with a small molar mass is selected from betaine and compound with a molar mass less than 1.9 times that of the compounds with a small molar mass is selected from erythritol. In this embodiment of the invention, the fraction enriched in betaine is typically recovered as the nanofiltration permeate and the fraction enriched in erythritol is recovered as the nanofiltration retentate. In another embodiment of the invention, the fraction enriched in betaine is recovered as the nanofiltration retentate and the fraction enriched in erythritol is recovered as the nanofiltration permeate, depending on the nanofiltration membrane.

In a further embodiment of the invention, the compound with a small molar mass is selected from betaine and compounds with a molar mass less than 1.9 times that of the compounds with a small molar mass are selected from glucose and inositol. In this embodiment of the invention, the fraction enriched in betaine is recovered as the nanofiltration retentate and the fraction enriched in glucose and inositol is recovered as the nanofiltration permeate. In another embodiment of the invention, the fraction enriched in betaine is recovered as the nanofiltration permeate and the fraction enriched in glucose and inositol is recovered as the nanofiltration retentate, depending on the nanofiltration membrane.

The separation of betaine into the nanofiltration retentate is typically carried out with a hydrophilic membrane, whereas the separation of betaine into the nanofiltration permeate is typically carried out with a hydrophobic membrane.

Betaine is typically separated from a biomass extract, such as a sugar beet pulp extract. The starting biomass extract may include large molecules, such as saccharose, as a typical component. In the embodiment of the invention where the desired betaine is recovered as the nanofiltration retentate, the fraction enriched in betaine is thus not free from large molecules, such as saccharose. To obtain a pure betaine fraction, saccharose can be separated from betaine using a second nanofiltration step. The fraction enriched in betaine is recovered as the nanofiltration permeate and the fraction enriched in saccharose is recovered as the nanofiltration retentate.

The invention can also be applied to the separation of one or more amino acids from betaine. This process comprises providing a starting solution comprising betaine and one or more amino acids, subjecting said solution to nanofiltration to obtain a fraction enriched in betaine and a fraction enriched in one or more amino acids, recovering the fraction enriched in betaine and recovering the fraction enriched in one or more amino acids. The invention can also be applied to the separation of one or more amino acids from a biomass hydrolysate or a biomass extract. In this process, said biomass hydrolysate or biomass extract is subjected to nanofiltration and a fraction enriched in said one or more amino acids is recovered. Said one or more amino acids are typically selected from leucine, isoleucine, serine, proline and valine.

The invention can also be applied to the separation of, carboxylic acids from one or more monosaccharides. This process comprises providing a starting solution comprising carboxylic-acids and one or more monosaccharides, subjecting said solution to nanofiltration to obtain a fraction enriched in carboxylic acids and a fraction enriched in one or more monosaccharides, recovering the fraction enriched in one or more monosaccharides, and recovering the fraction enriched in carboxylic acids. Said one or more monosaccharides may be selected from ketose sugars, especially tagatose.

The fraction enriched in compounds with a molar mass less than 1.9 times that of the compounds with a small molar mass may be further enriched in divalent ions.

The fraction enriched in compounds with a molar mass less than 1.9 times that of the compounds with a small molar mass may be further enriched in compounds with a molar mass of 1.9 to 4 times that of the compounds with a small molar mass and in compounds with a molar mass over 4 times that of the compounds with a small molar mass.

Compounds to be separated are essentially non-charged molecules.

In connection with the present invention, compounds with a large molar mass refer to compounds having a molar mass over 4 times that of the compounds with a small molar mass, such as lignosulphonates. Compounds with a relatively large molar mass refer to compounds having a molar mass of 1.9 to 4 times that of the compounds with a small molar mass, such as oligosaccharides.

In the nanofiltration of the invention, ionic substances, such as divalent ions are typically left in the retentate. In the process of the invention, ionic substances are thus simultaneously separated from the compounds with a small molar mass.

The compounds to be separated in accordance with the process of the invention are typically present in a biomass hydrolysate, such as a spent liquor obtained from a pulping process. The compounds to be separated may also be present in a biomass extract, such as a sugar beet pulp extract.

A typical dry substance content of the starting solution is 3 to 50% by weight, preferably 8 to 25% by weight. The content of the small compounds in the starting solution is typically 5 to 95%, preferably 15 to 55%, more preferably 15 to 40% and especially 8 to 27%, based on the dry substance content.

The dry substance content of the starting solution used as the nanofiltration feed is preferably less than 30%.

The starting solution may have been subjected to one or more pretreatment steps. The preteatment steps are typically selected from ion exchange, ultrafiltration, chromatography, concentration, pH adjustment, filtration, dilution, crystallization and combinations thereof.

In a preferred embodiment of the invention, the invention relates to a process of producing a xylose solution from a biomass hydrolysate. The process of the invention is characterized by nanofiltering said biomass hydrolysate and recovering as the permeate a solution enriched in xylose.

The biomass hydrolysate useful in the present invention is obtained from the hydrolysis of any biomass, typically xylan-containing vegetable material. The biomass hydrolysate can be obtained from the direct acid hydrolysis of biomass, from enzymatic or acid hydrolysis of a prehydrolysate obtained from biomass by prehydrolysis (with steam or acetic acid, for instance), and from sulphite pulping processes. Xylan-containing vegetable material include wood material from various wood species, particularly hardwood, such as birch, aspen and beech, various parts of grain (such as straw and husks, particularly corn and barley husks and corn cobs and corn fibers), bagasse, cocoanut shells, cottonseed skins etc.

In the process of the present invention, a xylose solution having a xylose content of over 1.1 times, preferably over 1.5 times, most preferably over 2.5 times that of the starting biomass hydrolysate (based on the dry substance content) is obtained, depending e.g. on the xylose content and pH of the biomass hydrolysate and the nanofiltration membrane used. Typically, a xylose solution having a xylose content of or over 1.5 to 2.5 times that of the starting biomass hydrolysate (based on the dry substance content) is obtained, depending e.g. on the xylose content and pH of the biomass hydrolysate and the nanofiltration membrane used.

The biomass hydrolysate used for the recovery of xylose in accordance with the present invention is typically a spent liquor obtained from a pulping process. The spent liquor is especially a spent sulphite pulping liquor, especially an acid spent sulphite pulping liquor. The spent sulphite pulping liquor is typically obtained from hardwood sulphite pulping.

The dry substance content of the starting biomass hydrolysate, such as spent liquor is typically 3 to 50% by weight, preferably 8 to 25% by weight.

The dry substance content of the nanofiltration feed is typically less than 30%.

The starting biomass hydrolysate has a typical xylbse content of 5 to 95%, preferably 15 to 55%, more preferably 15 to 40% and especially 8 to 27% by weight, based on the dry substance content.

The xylose content of the spent liquor to be treated is typically 10 to 40% by weight, based on the dry substance content. A spent liquor obtained directly from hardwood sulphite pulping has a typical xylose content of 10 to 20%, based on the dry substance content.

The spent hardwood sulphite pulping liquor also contains other monosaccharides in a typical amount of 10 to 30%, based on the xylose content. Said other monosaccharides include e.g. glucose, galactose, rhamnose, arabinose and mannose. Furthermore, the spent hardwood sulphite pulping liquor typically includes rests of pulping chemicals and reaction products of the pulping chemicals, lignosulphonates, oligosaccharides, disaccharides, xylonic acid, uronic acids, metal cations, such as calcium and magnesium cations, and sulphate and sulphite ions. The biomass hydrolysate used as starting material also contains rests of acids used for the hydrolysis of the biomass.

The spent liquor to be treated is typically a xylose-containing spent liquor obtained from a pulping process. A typical spent liquor useful in the present invention is a xylose-containing spent sulphite pulping liquor, which is preferably obtained from acid sulphite pulping. The spent liquor may be obtained directly from sulphite pulping. It may also be a concentrated sulphite pulping liquor or a side-relief obtained from sulphite cooking. It may also be a xylose-containing fraction chromatographically obtained from a sulphite pulping liquor or a permeate obtained by ultrafiltration of a sulphite pulping liquor. Furthermore, a post-hydrolyzed spent liquor obtained from neutral cooking is suitable.

The spent liquor useful in the present invention is preferably obtained from hardwood pulping. A spent liquor obtained from softwood pulping is also suitable, preferably after hexoses have been removed e.g. by fermentation.

In the present invention, the spent liquor to be treated may also be any other liquor obtained from the digestion or hydrolysis of biomass, typically cellulosic material with an acid. Such a hydrolysate can be obtained from cellulosic material for example by treatment with an inorganic acid, such as hydrochloric acid, sulphuric acid or sulphur dioxide, or by treatment with an organic acid, such as formic acid or acetic acid. A spent liquor obtained from a solvent-based pulping, such as ethanol-based pulping may also be used.

The process may also comprise one or more pretreatment steps. The pretreatment before the nanofiltration is typically selected from ion exchange, ultrafiltration, chromatography, concentration, pH adjustment, filtration, dilution and combinations thereof. Before the nanofiltration, the starting liquor is thus preferably pretreated by ultrafiltration or chromatography, for example. Furthermore, a prefiltering step to remove the solid substances can be used before the nanofiltration. The pretreatment of the starting liquor may also comprise concentration, e.g. by evaporation, and neutralization. The pretreatment may also comprise crystallization, whereby the starting liquor may also be a mother liquor obtained from the crystallization of xylose, for example.

In another preferred embodiment of the invention, the invention relates to the recovery of betaine from a biomass extract. A typical starting material for the recovery of betaine is a sugar beet pulp extract.

The nanofiltration for recovering xylose is typically carried out at a pH of 1 to 7, preferably 3 to 6.5, most preferably 5 to 6.5. The pH depends on the composition of the starting biomass hydrolysate and the membrane used for the nanofiltration and the stability of sugars or components to be recovered. If necessary, the pH of the spent liquor is adjusted to the desired value before nanofiltration. In the embodiment relating to the recovery of xylose from a spent liquor obtained from a pulping process, the same reagent as in the pulping stage is preferably used, such as $Ca(OH)_2$ or MgO, for example.

The nanofiltration for recovering betaine is typically carried out at a pH of 1 to 12, preferably 4 to 11.

The nanofiltration is typically carried out at a pressure of 10 to 50 bar, preferably 15 to 35 bar. A typical nanofiltration temperature is 5 to 95° C., preferably 30 to 80° C. The nanofiltration for recovering xylose is typically carried out at a temperature of 5 to 95° C., preferably 30 to 60° C.

The nanofiltration is typically carried out with a flux of 10 to 100 $l/m^2$ h.

The nanofiltration membrane used in the present invention can be selected from polymeric and inorganic membranes having a cut-off size of 100–2500 g/mol, preferably 150 to 1000 g/mol, most preferably 150 to 500 g/mol.

Typical polymeric nanofiltration membranes useful in the present invention include, for example, polyether sulfone membranes, sulfonated polyether sulfone membranes, polyester membranes, polysulfone membranes, aromatic polyamide membranes, polyvinyl alcohol membranes and polypiperazine membranes and combinations thereof. The nanofiltration membranes used in the present invention may also be selected from cellulose acetate membranes.

Typical inorganic membranes include $ZrO_2$- and $Al_2O_3$-membranes, for example.

Preferred nanofiltration membranes for the recovery of xylose are are selected from sulfonated polysulfone membranes and polypiperazine membranes. For example, specific useful membranes are: Desal-5 DK nanofiltration membrane (manufacturer Osmonics) and NF-200 nanofiltration membrane (manufacturer Dow Deutschland), for example.

The nanofiltration membranes which are useful in the present invention may have a negative or positive charge. The membranes may be ionic membranes, i.e. they may contain cationic or anionic groups, but even neutral membranes are useful. The nanofiltration membranes may be selected from hydrophobic and hydrophilic membranes.

The typical form of nanofiltration membranes is a flat sheet form. The membrane configuration may also be selected e.g. from tubes, spiral membranes and hollow fibers. "High shear" membranes, such as vibrating membranes and rotating membranes can also be used.

Before the nanofiltration procedure, the nanofiltration membranes may be pretreated with alkaline detergents or ethanol, for example.

In a typical nanofiltration operation, the liquor to be treated, such as a spent liquor is fed through the nanofiltration membrane using the temperature and pressure conditions described above. The liquor is thus fractionated into a low molar mass fraction including xylose (permeate) and a high molar mass fraction including the non-desired components of the spent liquor (retentate).

The nanofiltration equipment useful in the present invention comprises at least one nanofiltration membrane element dividing the feed into a retentate and permeate section. The nanofiltration equipment typically also include means for controlling the pressure and flow, such as pumps and valves and flow and pressure meters. The equipment may also include several nanofiltration membrane elements in different combinations, arranged in parallel or series.

The flux of the permeate varies in accordance with the pressure. In general, at a normal operation range, the higher the pressure, the higher the flux. The flux also varies with the temperature. An increase of the operating temperature increases the flux. However, with higher temperatures and with higher pressures there is an increased tendency for a membrane rupture. For inorganic membranes, higher temperatures and pressures and higher pH ranges can be used than for polymeric membranes.

The nanofiltration in accordance with the present invention can be carried out batchwise or continuously. The nanofiltration procedure can be repeated once or several times. Recycling of the permeate and/or the retentate back to the feed vessel (total recycling mode filtration) can also be used.

Before the nanofiltration, the starting solution may be subjected to one or more pretreatment steps. The pretreatment steps are selected from ion exchange, ultrafiltration, chromatography, concentration, pH adjustment, filtration, dilution, crystallization and combinations thereof.

The process may also comprise one or more post-treatment steps. The post-treatment steps are typically selected from ion exchange, crystallization, chromatography, concentration and colour removal.

After nanofiltration, the xylose may be recovered from the permeate, e.g. by crystallization. The nanofiltered solution can be used as such for the crystallization, without further purification and separation steps. If desire the nanofiltered xylose-containing liquor can be subjected to further purification, e.g. by chromatography, ion exchange, concentration by evaporation or reverse osmosis, or colour removal. The xylose may also be subjected to reduction, e.g. by catalytic hydrogenation, to obtain xylitol.

The process may also comprise a further step of recovering a solution rich in lignosulphonates, hexoses, oligosaccharides and salts as the retentate.

In a typical embodiment the invention, a solution enriched in pentoses is recovered as the permeate and a solution enriched in hexoses is recovered as the retentate. Furthermore, a solution enriched in divalent salts is obtained as the retentate.

The present invention also provides a method of regulating the xylose content of the permeate by regulating the dry substance content of the biomass hydrolysate, such as a spent liquor.

The invention also relates to the xylose solution obtained by the present invention. Furthermore, the invention relates to the use of the xylose solution thus obtained for the preparation of xylitol. Xylitol is obtained by reducing the xylose product obtained, e.g. by catalytic hydrogenation.

Preferred embodiments of the invention will be described in greater detail by the following examples, which are not construed as limiting the scope of the invention.

In the examples and throughout the specification and claims, the following definitions have been used:

DS refers to the dry substance content measured by Karl Fischer titration, expressed as % by weight.

RDS refers to the refractometric dry substance content, expressed as % by weight.

Flux refers to the amount (liters) of the solution that permeates through the nanofiltration membrane during one hour calculated per one square meter of the membrane surface, $l/(m^2\ h)$.

Fouling refers to the percentage difference in the flux values of pure water measured before and after the nanofiltration:

$$\text{fouling}\ (\%)=[(PWFb-PWFa)/PWFb]\times 100,$$

where PWFb is the flux of pure water before the nanofiltration of the xylose solution and PWFa is the flux of pure water after the nanofiltration of xylose solution under the same pressure.

Retention refers to the proportion of the measured compound retained by the membrane. The higher the retention value, the less is the amount of the compound transferred through the membrane:

$$\text{Retention}\ (\%)=[(\text{Feed}-\text{Permeate})/\text{Feed}]\times 100,$$

where "Feed" refers to the concentration of the compound in the feed solution (expressed e.g. in g/l) and "Permeate" refers to the concentration of the compound in the permeate solution (expressed e.g. in g/l).

HPLC refers to liquid chromatography.

The following membranes were used in the examples:

Desal-5 DK (a four-layered membrane consisting of a polyester layer, a polysulfone layer and two proprietary layers, having a cut-off size of 150 to 300 g/mol, permeability (25° C.) of 5.4 $l/(m^2\ h\ bar)$ and $MgSO_4$-retention of 98% (2 g/l), manufacturer Osmonics), Desal-5 DL (a four-layered membrane consisting of a polyester layer, a polysulfone layer and two proprietary layers, having a cut-off size of 150 to 300 g/mol, permeability (25° C.) of 7.6 $l/(m^2\ h\ bar)$, $MgSO_4$-retention of 96% (2 g/l), manufacturer Osmonics), NTR-7450 (a sulfonated polyethersulfone membrane having a cut-off size of 500 to 1000 g/mol, permeability (25° C.) of 9.4 $l/(m^2\ h\ bar)$, NaCl-retention of 51% (5 g/l), manufacturer Nitto Denko), and NF-200 (a polypiperazine membrane having a cut-off size of 200 g/mol, permeability (25° C.) of 7–8 $l/(m^2\ h\ bar)$, NaCl-retention of 70%, manufacturer Dow Deutschland), TS-80 (manufacturer Trisep), ATF-60 (manufacturer PTI Advanced Filtration Inc.), Desal AG (manufacturer Osmonics), Desal G10 (a thin film membrane of aromatic polyamide/polysulfone material having a cut-off-size of 2500 g/mol, permeability (25° C.) of 3.4 l/($m^2$ h bar), NaCl-retention of 10%, retention of dextrane (1500 g/ml) of 95%, retention of glucose of 50%, manufacturer Osmonics), ASP 10 (a membrane consisting of sulfonated polysulfone on polysulfone, having a permeability (25° C.) of 16 l/($m^2$ h bar), NaCl-retention of 10%, manufacturer Advanced Membrane Technology), TS 40 (a membrane consisting of fully aromatic polyamide, having a permeability of (25° C.) of 5.6 l/($m^2$ h bar), manufacturer TriSep), ASP 20 (a membrane consisting of sulfonated polysulfone on polysulfone, having a permeability (25° C.) of 12.5 l/($m^2$ h bar), NaCl-retention of 20%, manufacturer Advanced Membrane Technology), UF-PES-4H (a membrane consisting of polyethersulfone on polypropylene, having a cut-off size of about 4000 g/mol, a permeability (25° C.) of 7 to 17 l/($m^2$ h bar), manufacturer Hoechst), NF-PES-10 (a polyethersulfone membrane, havig a cut-off size of 1000 g/mol, a permeability (25° C.) of 5 to 11 l/($m^2$ h bar), NaCl-retention less than 15% (5 g/l), manufacturer Hoechst), NF45 (a membrane consisting of aromatic polyamide, having a permeability (25° C.) of 4.8/l($m^2$ h bar), NaCl-retention of 45%, manufacturer Dow Deutschland).

EXAMPLE I

Separation of xylose from a spent suphite pulping liquor using vanous nanofiltration membranes at various pH values This example illustrates the effect of the membrane and pH on the performance of nanofiltration (filtrations C1, C3, C6 and C8) in the separation of xylose. The liquor to be treated was a diluted runoff of the crystallization of a Mg-based sulphite spent pulping liquor obtained from beechwood pulping, which had been chromatographically purified using an ion exchange resin in $Mg^{2+}$ form. The pH of the solution was adjusted to the desired value (see Table I) with MgO. Before the nanofiltration, the liquor was pretreated by dilution (filtrations C1 and C3), by filtration through a filter paper (filtration C6) or with MgO dosing combined with filtration through a filter paper (filtrations C7 and C8).

A batch mode nanofiltration was carried out using a laboratory nanofiltration equipment consisting of rectangular cross-flow flat sheet modules with a membrane area of 0.0046 $m^2$. Both the permeate and the retentate were recycled back to the feed vessel (total recycling mode filtration). The feed volume was 20 liters. During the filtration, the cross-flow velocity was 6 m/s and the pressure was 18 bar. The temperature was kept at 40° C.

Table I presents the results of the total recycling mode filtrations. The flux values in Table I were measured after 3 hours of filtration. Table I shows the dry substance content (DS) in the feed (%), the xylose content in the feed and in the permeate (based on the dry substance content), the permeate flux at a pressure of 18 bar and the flux reduction caused by fouling. The membranes were Desal-5 DK and NTR-7450.

TABLE I

| Filtration No., membrane | PH | DS in the feed, w-% | Xylose in feed, % on DS | Xylose in permeate, % on RDS | Flux l/($m^2$h) | Fouling, % |
|---|---|---|---|---|---|---|
| C1, Desal-5-DK | 3.4 | 8.1 | 22.6 | 27.4 | 31 | 1 |
| C6* Desal-5-DK | 3.4 | 9.7 | 20.3 | 33.5 | 23 | 1 |
| C7* Desal-5-DK | 5.9 | 8.2 | 21.7 | 55.2 | 58 | 3 |
| C3, NTR-7450 | 3.4 | 7.6 | 24.3 | 29.9 | 25 | 29 |
| C8, NTR-7450 | 6.1 | 8.3 | 21.8 | 34.5 | 43 | 25 |
| C8, Desal-5-DK | 6.1 | 8.3 | 21.8 | 45 | 30 | 1 |

*average value of two membranes

The results of Table I show that nanofiltration provides xylose concentrations of 1.5 to 2.5 times those of the feed. When the pH in the feed is high, the xylose content on RDS in the permeate is high. The xylose content on RDS in the permeate is high for example when pH is 5.9 or 6.1. Furthermore, the flux was improved even to two-fold at higher pH values. The Desal-5 DK membrane at a high pH provided the best results.

EXAMPLE II

Separation of Xylose at Various Temperatures

The effect of the temperature was studied using the same equipment and the same spent liquor solution as in. Example 1. The temperature during the nanofiltration was raised from 25° C. to 55° C. The membrane was Desal-5 DK, and the nanofiltration conditions were the following: pH 3.4, pressure 16 bar, cross-flow velocity 6 m/s, DS 7.8%. The feed concentration and pressure were kept constant during the experiment.

Table II shows the xylose contents in the feed and in the permeate, based on the dry substance content (permeate values are average values of two membranes).

TABLE II

| Temperature, ° C. | Xylose in feed, % on DS | Xylose in permeate, % on RDS |
|---|---|---|
| 25 | 24.5 | 23.8 |
| 40 | 24.5 | 29.9 |
| 55 | 24.6 | 34.6 |

The results of Table II show that the higher the temperature, the higher concentrations of xylose can be obtained.

EXAMPLE III

Separation of Xylose Using Ultrafiltration as Pretreatment (A) Pretreatment with Ultrafiltration Concentration mode ultrafiltrations DU1 and DU2 were carried out using an RE filter (rotation-enhanced filter). In this filter, the blade rotates near the membrane surface minimizing the concentration polarization during the filtration. The filter was a home-made cross-rotational filter. The rotor speed was 700 rpm. In filtration DU1, the membrane was C5F UF (a membrane of regenerated cellulose having a cut-off size of 5000 g/mol, manufacturer Hoechst/Celgard). In filtration DU2, the membrane was Desal G10 (a thin film membrane having a cut-off size of 2500 g/mol, manufacturer Osmonics/Desal).

Concentration mode filtrations were made using a Mg-based sulphite spent pulping liquor obtained from beechwood pulping. The filtration was carried out at a temperature of 35° C. and a pH of 3.6. The results are presented in Table IIIa.

TABLE IIIa

| Filtration No. | Membrane | DS in feed, % | Filtration time | Xylose in feed, % on DS | Xylose in permeate, % on RDS |
|---|---|---|---|---|---|
| DU1 | C5F | 14.4 | 1 hour | 16.3 | 23.2 |
| DU1 | C5F | 22.0 | 23 hours | 9.2 | 20.0 |
| DU2 | Desal G10 | 12.2 | 3 days | 12.7 | 41.6 |

(B) Nanofiltration

A one-day laboratory-scale experiment where the permeate was collected out was carried out with the same equipment as in Example 1 (filtrations DN1 and DN2). The liquor to be treated was a Mg-based sulphite spent pulping liquor obtained from beechwood pulping.

In filtration DN1, the ultrafiltered spent liquor (DU1 using a C5F membrane) was used as the feed solution. The pH of the solution was adjusted to 4.5 using MgO, and the liquor was prefiltered through a filter paper before nanofiltration. Nanofiltration was carried out at a pressure of 19 bar and at a temperature of 40° C.

Filtration DN2 was carried out using the diluted original spent liquor. Its pH had been adjusted to 4.8 and the solution was prefiltered through a filter paper before nanofiltration. The nanofiltration was carried out at a pressure of 17 bar and at a temperature of 40° C. After about 20 hours of filtration, a permeate volume of 5 liters and a concentrate volume of 20 liters were obtained.

Both filtrations DN1 and DN2 were carried out at a cross-flow velocity of 6 m/s. Fouling was about 1% in both filtrations. The nanofiltration membrane in both filtrations was Desal-5 DK.

In each filtration DN1 and DN2, the nanofiltration membrane was pretreated in three different ways: (1) no pretreatment, (2) washing the membrane with ethanol, and (3) washing the membrane with an alkaline detergent.

The results are set forth in Table IIIb:

TABLE IIIb

| Filtration | PH | DS in feed, % | Xylose in feed, % on DS | Xylose in permeate, % on RDS (1)/(2)/(3) | Flux, l/(m$^2$h) at 20 h |
|---|---|---|---|---|---|
| DN1 | 4.5 | 10.7 | 21.1 | 24/35/49 | 14 (19 bar) |
| DN2 | 4.6 | 12.3 | 16.8 | N.A.*/35/34 | 22/32 (17/19 bar) |

*(N.A. = not analyzed)

The results of Table IIIb show that the proportion of xylose in the dry solids of the permeate obtained from the nanofiltration was somewhat changed when ultrafiltration was used as a pretreatment step. On the other hand, washing the membrane with ethanol or an alkaline detergent increased the xylose content considerably.

EXAMPLE IV

Separation of Xylose at Various Pressures

Experiment DS1 was carried out using DSS Labstak® M20-filtering equipment operating with total recycling mode filtration (manufacturer Danish Separation Systems AS, Denmark). The liquor to be treated was the same as in Example III. The temperature was 35° C. and the flow rate was 4.6 l/min. The membrane was Desal-5 DK. Before the experiments, the pH of the spent liquor was adjusted to 4.5 and the liquor was prefiltered through a filter paper.

The results are shown in Table IVa.

TABLE IVa

| Filtration | Pressure | DS in feed, % on DS | Xylose in feed, % on DS | Xylose in permeate, % on RDS | Flux, l/(m$^2$h) |
|---|---|---|---|---|---|
| DS1 | 22 bar | 11.4 | 17.3 | 24.5 | 18 |
| | 35 bar | 12.1 | 16.5 | 20.9 | 42 |

Further experiments (filtrations DV1 and DV2) were carried out using a V ◇ SEP filter (manufacturer New Logic), which is a high shear rate filter. Its efficiency is based on vibrating motion that causes a high shear force on the membrane surface. In filtration DV1, the feed concentration has been increased during the filtration by adding new concentrated feed to the vessel. At the same time the pressure was also increased. Table V shows the xylose, content based on the dry solids contents in the feed and in the permeate at two feed dry solids concentrations.

TABLE IVb

| Filtration | DS in feed, % | Pressure, bar | Xylose in feed, % on DS | Xylose in permeate, % on RDS | Flux, l/(m$^2$h) |
|---|---|---|---|---|---|
| DV1 | 11 | 21 | 16 | 20 | 75 |
| DV2 | 21 | 35 | 16 | 42 | 22 |

It can be seen from the results of Tables IVa and IVb that a simultaneous increase of the nanofiltration pressure and the dry substance content of the feed increased the xylose content of the permeate.

EXAMPLE V

Separation of Xylose at Various Values of the Feed Dry Solids

The liquor to be treated was the ultrafiltered liquor from filtration DU2 of Example III (the ultrafiltration had been carried out with Desal G10 membrane from Osmonics/Desal). The nanofiltration was carried out at a pressure of 30 bar, a temperature of 35° C. and a pH of 5.3). The nanofiltration membranes were Desal-5 DK, Desal-5 DL and NF 200.

The effect of feed dry solids content on the membrane performance is presented in Table V.

TABLE V

| DS in feed, % | Xylose in feed, % on DS | Xylose in permeate, % on DS | | |
|---|---|---|---|---|
| | | Desal-5DK | Desal-5 DL | NF 200 |
| 5.6 | 33.2 | 31 | 26 | 42 |
| 10.3 | 32.5 | 42 | 35 | 60 |
| 18.5 | 29.8 | 69 | 65 | 64 |

For comparative purposes, the contents of other carbohydrates (in addition to xylose), oligosaccharides, xylonic acid, metal cations ($Ca^{2+}$ and $Mg^{2+}$) as well as sulphite and sulphate ions were analyzed from samples taken from a concentration mode ultrafiltration (DS4) at three different concentrations (the feed samples) and from the corresponding permeates obtained from nanofiltration with three different nanofiltration membranes (the permeate samples).

The results are set forth in Table Va. In Table Va, sample numbers A, B and C refer to samples taken from the feed (liquor ultrafiltered with Desal G10 membrane) in a concentration mode filtration at three different dry substance contents (DS) of 5.6, 10.3 and 18.5, sample numbers D, E and F refer to corresponding samples taken from the permeate obtained from nanofiltration with a Desal 5DK membrane, sample numbers G, H and I refer to corresponding samples taken from the permeate obtained from nanofiltration with a Desal-5 DL membrane, and sample numbers J, K and L refer to the corresponding samples taken from the permeate obtained from nanofiltration with a NF 200 membrane.

In Table Va, the contents of carbohydrates were analyzed using HPLC with $Pb^{2+}$ form ion exchange column and RI detection, disaccharides using HPLC with $Na^{30}$ form ion exchange column and the contents of xylonic acid using HPLC with anion exchange column and PED detection.

Furthermore, Table Vb shows the carbohydrate contents and some other analytical results of the feed liquid at a dry substance content of 18.5% (sample C above) and of the corresponding permeate samples (samples F, I and L above) (ultrafiltration as the pretreatment step; the nanofiltering conditions: 35° C., 30 bar, pH 5.3, DS in the feed 18.5%, DSS LabStak® M20).

TABLE Vb

| | Feed | Permeate | | |
|---|---|---|---|---|
| | UF permeate (sample C) | Desal-5 DK (sample F) | Desal-5 DL (sample I) | NF-200 (sample L) |
| PH | 5.4 | 4.8 | 4.9 | 5.2 |
| Conductivity, mS/cm | 13.1 | 2.2 | 2.8 | 4.5 |
| Colour I | 99300 | 7050 | 12200 | 7540 |
| UV 280 nm, 1/cm | 350 | 17 | 16 | 18 |
| Xylose, % on DS | 29.8 | 69.0 | 65.0 | 64.0 |
| Glucose, % on DS | 3.9 | 2.8 | 1.9 | 3.9 |
| Xylonic acid, % on DS | 12.7 | 4.0 | 5 | 4.1 |
| $Mg^{2+}$, % on DS | 4.6 | 0.04 | 0.3 | 2.5 |
| $SO_4^{2-}$, % on DS | 3.8 | 0.1 | 0.5 | 0.4 |

Tables Va and Vb show that nanofiltration effectively concentrated pentoses, such as xylose and arabinose in the permeate, while removing an essential amount of disaccharides, xylonic acid, magnesium and sulphate ions from the xylose solution. Hexoses, such as glucose, galactose, rhamnose and mannose were not concentrated in the permeate.

The purity of xylose solutions can thus be effectively increased by nanofiltration. Furthermore, nanofiltration demineralizes the spent liquor by removing 98% of the divalent ions.

EXAMPLE VI

Separation of Xylitol and Sorbitol

This example illustrates the separation of xylitol and sorbitol with nanofiltration from a feed solution including these two compounds. The nanofiltration was carried out with DSS Labstak M20 filter using a cross-flow velocity of about 0.6 m/s, a temperature of 50° C., a pressure of 18 bar and a pH in the range of 7 to 8. The nanofiltration membranes were Desal-5 DK, Desal-5 DL and TS-80. The nanofiltration was carried out in two stages: first a batch mode concentration filtration to volume reduction of 50%, TABLE Va

| | A DS4. S1 | B DS4. S2 | C DS4. S3 | D DS4. DK1 | E DS4. DK2 | F DS4. DK3 | G DS4. DL1 | H DS4. DL2 | I DS4. DL3 | J DS4. NF1 | K DS4. NF2 | L DS4. NF3 |
|---|---|---|---|---|---|---|---|---|---|---|---|---|
| Carbohydrates, % on DS | | | | | | | | | | | | |
| glucose | 3.0 | 3.8 | 3.9 | 1 | 1.4 | 2.8 | 1 | 1 | 1.9 | 2 | 3 | 3.9 |
| xylose | 33.2 | 32.5 | 29.8 | 31 | 42 | 69 | 26 | 35 | 65 | 42 | 60 | 64.0 |
| galactose + rhamnose | 1.9 | 1.9 | 1.9 | 0.7 | 1.0 | 1.6 | 0.7 | 0.9 | 1.5 | 1 | 1.5 | 2.1 |
| arabinose | 0.3 | 0.3 | 0.3 | 0.3 | 0.3 | 0.6 | n.a. | 0.3 | 0.7 | 0.5 | 0.6 | 0.5 |
| mannose | 3.2 | 3.2 | 3.3 | 1 | 1.5 | 2.7 | 1 | 1.5 | 2.6 | 2 | 3 | 3.2 |
| Disaccharides, % on DS | 0.5 | 0.5 | 0.5 | n.d. | 0.2 | n.d. | n.d. | n.d. | 0.1 | n.d. | n.d. | n.d. |
| Xylonic acid, % on DS | 11.5 | 11.6 | 12.7 | 5 | 5 | 4 | 5 | 5 | 5 | 5 | 5 | 4.1 |
| Metals (ICP), % on DS | | | | | | | | | | | | |
| Ca | 0.12 | 0.11 | 0.11 | 0.7 | 0.4 | 0.1 | 0.7 | 0.5 | 0.1 | 0.4 | 0.3 | 0.1 |
| Mg | 2.1 | 4.0 | 4.6 | 0.5 | 0.4 | 0.04 | 0.9 | 0.9 | 0.3 | 2.1 | 2.6 | 2.5 |
| Sulphite (IC), % on DS | 0.51 | 0.62 | 0.59 | 0.4 | 0.3 | 0.5 | 0.5 | 0.4 | 0.6 | 0.3 | 0.6 | 0.9 |
| Sulphate (IC), % on DS | 2.9 | 3.2 | 3.8 | 0.2 | 0.2 | 0.1 | 1 | 0.8 | 0.5 | 0.6 | 0.5 | 0.4 |

n.a. = not analyzed
n.d. = not detected followed by diafiltration at a constant feed volume so far that the same amount of permeate was obtained as the feed volume was at the beginning of the diafiltration. In both nanofiltration stages (batch mode concentration filtration and diafiltration), the concentrate was circulated back to the feed. RDS of the feed of the first nanofiltration stage (Feed 1) was 10.4 g/100 g. RDS of the feed of the second stage (Feed 3, at the end of the diafiltration) was 10.6 g/100 g. Table VI presents the contents of xylitol and sorbitol (in % on RDS) as well as the ratio of xylitol to sorbitol in the two feeds (Feed 1 and Feed 3) and in the nanofiltration permeates obtained from nanofiltrations of each feed with three different membranes.

TABLE VI

| | Xylitol, % on RDS | Sorbitol, % on RDS | Xylitol/sorbitol ratio |
|---|---|---|---|
| Feed-1 | 59 | 39 | 1.5 |
| Desal-5 DK-1 | 70 | 26 | 2.7 |
| Desal-5 DL-1 | 69 | 30 | 2.3 |
| TS-80-1 | 73 | 28 | 2.6 |
| Feed-3 | 52 | 46 | 1.1 |
| Desal-5 DK-3 | 65 | 31 | 2.1 |
| Desal-5 DL-3 | 62 | 35 | 1.8 |
| TS-80-3 | 71 | 30 | 2.4 |

Xylitol (152.15 g/mol) permeated more preferably than sorbitol (182.17 g/mol). Xylitol is enriched in the nanofiltration permeate and can thus be separated from sorbitol, which remains in the nanofiltration retentate.

EXAMPLE VII

Separation of Arabinose and Rhamnose

This example illustrates the separation of arabinose and rhamnose from a feed solution having DS of about 10% and containing 60% arabinose on DS and 40% rhamnose on DS. The nanofiltration was carried out with DSS Labstack M20 filter using a cross-flow velocity of about 0.6 m/s, a temperature of 50° C., a pressure of 21 bar and a pH of 7. The nanofiltration membranes were ATF-60, Desal-5 DK, Desal-5 DL and TS-80. The nanofiltration was carried out in two stages: first a batch mode concentration filtration to volume reduction of 50%, followed by diafiltration at constant feed volume so far that the same amount of permeate was obtained as the feed volume was at the beginning of the diafiltration. In both nanofiltration stages (batch mode concentration filtration and, diafiltration), the concentrate was circulated back to the feed. Table VII presents the ratio of arabinose to rhamnose in the feed and in the nanofiltration permeates obtained from nanofiltrations with four different membranes.

TABLE VII

| | Arabinose/rhamnose ratio at the beginning of the nanofiltration | Arabinose/rhamnose ratio at the end of the diafiltration |
|---|---|---|
| Feed | 1.5 | 1.1 |
| ATF-60 | 2.8 | 2.2 |
| Desal-5 DK | 2.7 | 2.1 |
| Desal-5 DL | 2.3 | 1.7 |
| TS-80 | 2.1 | 1.7 |

Ratio of arabinose (150.13 g/mol) to rhamnose (164.16 g/mol) was about two times higher in the permeate than in the feed. Arabinose as a pentose sugar is enriched in the nanofiltration permeate and can thus be separated from rhamnose (a hexose sugar), which remains in the nanofiltration retentate.

EXAMPLE VIII

Separation of Betaine from Erythritol and Glycerol

This example illustrates the separation of betaine from erythritol and glycerol. The feed solution with DS of 9% contained betaine in an amount of 20.5 g/l, erythritol in an amount of 24 g/l and glycerol in an amount of 45.3 g/l. The nanofiltration was carried out with DSS Labstack M20 filter using a cross-flow velocity of about 0.6 m/s, a temperature of 70° C., a pressure of 17 bar and a pH of 7.3. The nanofiltration membranes were Desal AG, NF45, Desal-5 DL and Desal-5 DK. The results of the nanofiltration are set forth in Table VIII.

TABLE VIII

| | Retention of betaine, % | Retention of erythritol, % | Retention of glycerol, % |
|---|---|---|---|
| Desal AG | 61 | 52 | 22 |
| NF 45 | 93 | 26 | 9 |
| Desal-5 DL | 89 | 17 | 4 |
| Desal-5 DK | 94 | 25 | 6 |

The retention of betaine (117.15 g/mol) was thus significantly higher than the retention of erythritol (122.12 g/mol) and glycerol (92.09 g/mol).

EXAMPLE IX

Separation of Betaine from Glucose, Inositol and Erythritol

This example illustrates the separation of betaine from glucose, inositol and erythritol. The original feed solution had RDS of 8.8 g/100 g and contained all four compounds in an equal amount of 20% on DS. The nanofiltration was carried out with DSS Labstack M20-filter using a cross-flow velocity of about 0.6 m/s, a temperature of 70° C., a pressure of 18 bar and a pH of 6.9. The nanofiltration membranes were Desal-5 DK and Desal-5 DL. The nanofiltration was carried out in two stages: first a batch mode concentration filtration to volume reduction of 50%, followed by diafiltration at a constant feed volume so far that the same amount of permeate was obtained as the feed volume was at the beginning of the diafiltration. Table IX shows the contents of each compound in the feed and the retentions (%) of each compound after the diafiltration stage.

TABLE IX

| | Glucose | Inositol | Erythritol | Betaine |
|---|---|---|---|---|
| Feed, g/l | 19.0 | 26.4 | 6.9 | 28.6 |
| Desal-5 DK | 73% | 82% | 12% | 91% |
| Desal-5 DL | 57% | 71% | 6% | 85% |

The retention of betaine (117.15 g/mol) was even 90%. The separation of betaine from erythritol (122.12 g/mol) was very clear, although the difference in their molar masses is very small.

EXAMPLE X

Separation of Betaine from Glucose and Inositol

This example illustrates the separation of betaine from glucose and inositol using NTR-7450 nanofiltration membrane. The original feed solution had RDS of 8.8 g/100 g and contained all three compounds in an equal amount of 20% on DS. The nanofiltration was carried out with DSS Labstack M20 filter using a cross-flow velocity of about 0.6 m/s, a temperature of 70° C., a pressure of 18 bar and a pH of 6.9. The nanofiltration was carried out in two stages: first a batch mode concentration filtration to volume reduction of 50%, followed by diafiltration at a constant feed volume so far that the same amount of permeate was obtained as the feed volume was at the beginning of the diafiltration. Table X shows the retentions (%) and the feed compositions (g/l) after the diafiltration stage.

TABLE X

| | Glucose | Inositol | Betaine |
|---|---|---|---|
| Feed, g/l | 19.0 | 26.4 | 28.6 |
| NTR-7450 | 46% | 41% | 10% |

The NTR-7450 membrane did not retain betaine and the retention of glucose and inositol was better than the retention of betaine. Betaine was thus enriched in the nanofiltration permeate.

EXAMPLE XI

This example illustrates the separation of maltose from maltotriose.

The liquor to be treated was a maltose syrup having a maltose content of about 84% on RDS or about 7.6–7.8% on liquid weight, a maltotriose content of about 8.5 to 8.8 on RDS or about 0.8% on liquid weight and a dry substance content of about 9.2% by weight.

A batch mode nanofiltration with nine different nanofiltration membranes was carried out using a laboratory nanofiltration equipment consisting of rectangular cross-flow flat sheet modules with a membrane area of 0.0046 $m^2$. The nanofiltration equipment contained three nanofiltration elements in parrallel, whereby three different membranes could be tested at the same time with the same feed. The feed volume in all tests was 20 liters. Before the nanofiltration, the membranes were washed with water.

The nanofiltration temperature was about 35° C. In the first three filtrations (tests 1 to 14), pH was between 6 and 7. In the fourth filtration (tests 15 to 19), pH was 4.5.

In the first filtration (tests 1 to 6), the pressure was gradually increased from 8 bar to 18 bar. The subsequent filtrations (tests 7 to 19) were made at a pressure of 18 bar. All tests were carried out with a cross-flow velocity of 6 m/s.

The contents of carbohydrates (maltotriose and maltose) on liquid weight (% of lw) and/or on RDS (% of RDS) were analyzed from the feed liquid before the nanofiltration, from the permeate obtained from the nanofiltration with nine different nanofiltration membranes and from the feed liquid after the nanofiltration (the retentate obtained from the nanofiltration). Furthermore, the contents of metal ions (Na, Ca) (mg/kg RDS) as well as the ratio of maltose to maltotriose were measured from the same samples. The results of the nanofiltration tests are set forth in Tables XI and XII.

The results of Tables XI and XII show that the tested membranes retained a higher proportion of maltotriose than maltose, resulting in a clear increase in the ratio of maltose to maltotriose in the permeate. The best results are obtained with NTR-7450 and Desal G10 membranes. For instance, with Desal G10 membrane, the ratio of maltose to maltotriose in the permeate is about 28-fold compared to the corresponding ratio in the feed before the nanofiltration. The results also show that oligosaccharides are almost completely retained by the nanofiltration membranes.

As a conclusion, maltotriose can thus be effectively separated from maltose using nanofiltration.

TABLE XI

| | 1 MA1-S1 | 2 MA1-B1 | 3 MA1-C1 | 4 MA1-S2 | 5 MA1-B2 | 6 MA1-C2 | 7 MA2-S2 | 8 MA2-PB | 9 MA2-PC | 10 MA2-S3 |
|---|---|---|---|---|---|---|---|---|---|---|
| Carbohydrates (HPLC with $Na^+$ form ion exchange column): | | | | | | | | | | |
| maltotriose (% of RDS) | 8.5 | 0.8 | 0.6 | 8.4 | 0.2 | 0.3 | 8.5 | 5.8 | 4.3 | 8.5 |
| maltose (% of lw) | 7.62 | 0.30 | 1.53 | 7.80 | 0.21 | 1.14 | 7.67 | 0.27 | 2.88 | 7.88 |
| maltose (% of RDS) | 84.1 | 57 | 73.5 | 83.7 | 56 | 74.2 | 84.0 | 70 | 79.8 | 83.5 |
| Ratio maltose/maltotriose | 10 | 69 | 132 | 10 | 250 | 283 | 10 | 12 | 18 | 10 |
| Increase in the ratio maltose/maltotriose (x-fold) | | 6.9 | 13.2 | | 25.0 | 28.3 | | 1.2 | 1.8 | |
| Metals (ICP) mg/kg RDS: | | | | | | | | | | |
| Na | 220 | 1610 | 580 | 215 | 1610 | 650 | 210 | 1840 | 300 | 210 |
| Ca | 110 | <190 | 100 | 110 | <259 | 90 | 110 | <259 | 60 | 130 |

| | | | |
|---|---|---|---|
| 1 | MA1-S1 | feed liquid | |
| 2 | MA1-B1 | Permeate 14 bar | NTR-7450 |
| 3 | MA1-C1 | Permeate 14 bar | Desal G10 |
| 4 | MA1-S2 | feed liquid | |
| 5 | MA1-B2 | Permeate for 18 bar | NTR-7450 |
| 6 | MA1-C2 | Permeate for 18 bar | Desal G10 |
| 7 | MA2-S2 | feed liquor at start | |
| 8 | MA2-PB | Permeate for 18 bar | NF200 |
| 9 | MA2-PC | Permeate for 18 bar | ASP 10 |
| 10 | MA2-S3 | feed liquor in the end | |

TABLE XII

| | 11 MA3-S2 | 12 MA3-PA | 13 MA3-PB | 14 MA3-S3 | 15 MA4-S2 | 16 MA4-PA | 17 MA4-PB | 18 MA4-PC | 19 MA4-S3 |
|---|---|---|---|---|---|---|---|---|---|
| Carbohydrates (HPLC with $Na^+$ form ion exchange column): | | | | | | | | | |
| maltotriose (% of RDS) | 8.6 | 5.5 | 4.0 | 8.9 | 8.8 | 5.5 | 4.2 | 5.0 | 8.9 |
| maltose (% of lw) | 7.72 | 2.30 | 2.13 | 7.91 | 7.70 | 5.85 | 3.06 | 1.70 | 7.85 |
| maltose (% of RDS) | 84.0 | 83.8 | 79.5 | 84.9 | 84.4 | 85.8 | 87.3 | 81.7 | 84.8 |
| Ratio maltose/maltotriose | 10 | 15 | 20 | 10 | 10 | 16 | 21 | 16 | 10 |
| Increase in the ratio maltose/maltotriose (x-fold) | | 1.5 | 2.0 | | | 1.6 | 2.1 | 1.6 | |
| Metals (ICP) mg/kg RDS: | | | | | | | | | |
| Na | 210 | 470 | 410 | 215 | 210 | 220 | 330 | 430 | 240 |
| Ca | 120 | 135 | 40 | 130 | 80 | 90 | 130 | 100 | 120 |

| | | | |
|---|---|---|---|
| 11 | MA3-S2 | feed liquor at start | |
| 12 | MA3-PA | Permeate 18 bar | TS 40 |
| 13 | MA3-PB | Permeate 18 bar | ASP 20 |
| 14 | MA3-S3 | feed liquor in the end | |
| 15 | MA4-S2 | feed liquor at start | |
| 16 | MA4-PA | Permeate 18 bar | UF-PES-4H |
| 17 | MA4-PB | Permeate 18 bar | NF-PES-10 |
| 18 | MA4-PC | Permeate 18 bar | NF45 |
| 19 | MA4-S3 | feed liquor in the end | |

EXAMPLE XII

Separation of Maltose from Maltotriose at Varying Concentrations of Maltose in the Feed This example illustrates the separation of maltose from maltotriose and other oligomers with different maltose concentrations in the feed. The liquors used in the nanofiltration were fractions obtained from chromatographic separation or mixtures thereof. The feed liquors had varying concentrations of maltose (3.9, 7.3, 10.7 and 15.0 g/100 g, respectively) and a DS in the range of, 14.3 to 15.7% (the DS values of the nanofiltration feeds were approximately the same). The nanofiltration was carried out using NTR 7450 nanofiltration membrane, a nanofiltration pressure of 25 to 30 bar, a flow velocity of about 0.6 m/s and a temperature of 35° C.

The results are set forth in Table XIII. The oligomers refer to oligomers with a polymerization degree of 3 or higher, including maltotriose.

TABLE XIII

| NTR-7450 | Maltose | | Oligomers | |
|---|---|---|---|---|
| membrane Feed | Feed, g/100 g | Retention | Feed, g/100 g | Retention |
| Oligomer fraction | 3.9 | 73% | 11.8 | 97% |
| Glucose fraction | 7.3 | 72% | 0.3 | 92% |
| Maltose and glucose fraction | 10.7 | 68% | 0.4 | 97% |
| Maltose fraction | 15.0 | 52% | 0.4 | 83% |

The retention of oligomers (including maltotriose) is maintained high even at higher concentrations, whereas the retention of maltose decreases with increasing concentrations of maltose in the feed. The permeation of maltose is thus increased with increasing maltose concentrations. Hereby the separation of maltose from maltotriose and other oligomers is improved with increasing concentrations of maltose in the feed.

EXAMPLE XIII

Separation of Amino Acids and Betaine

This example illustrates the separation of amino acids (serine and proline) from betaine using Desal-5 DL and Desal-5 DK membranes. The feed solution contained betaine and amino acids and had a DS in the range of 2.6 to 3.0 g/100 g. The nanofiltration was carried out using a flow velocity of about 0.6 m/s, a temperature of 70° C., a pressure of 16 bar to 25 bar and a pH of about 10. The results expressed as average retentions are set forth in Table XIV.

TABLE XIV

| Average retention | Serine | Proline | Betaine |
|---|---|---|---|
| Desal-5 DL | 71% | 35% | 70% |
| Desal-5 DK | 76% | 46% | 78% |

Proline is thus clearly separated from betaine and serine.

The foregoing general discussion and experimental examples are only intended to be illustrative of the present invention, and not to be considered as limiting. Other variations within the spirit and scope of this invention are possible and will present themselves to those skilled in the art.

The invention claimed is:

1. A process of separating compounds with a small molar mass from compounds having a molar mass higher than but less than 1.9 times that of the compounds with a small molar mass, comprising providing a starting solution comprising compounds with a small molar mass and compounds with a molar mass higher than but less than 1.9 times that of the compounds with a small molar mass, subjecting said solution to nanofiltration to obtain a fraction enriched in compounds with a small molar mass and a fraction enriched in compounds with a molar mass higher than but less than 1.9 times that of the compounds with a small molar mass, recovering the fraction enriched in compounds with a small molar mass, and optionally recovering the fraction enriched in compounds with a molar mass higher than but less than 1.9 times that of the compounds with a small molar mass.

2. A process as claimed in claim 1, wherein the compounds with a small molar mass have a molar mass of up to 250g/mol.

3. A process as claimed in claim 1, wherein the compounds having a molar mass higher than but less than 1.9 times that of the compounds with a small molar mass have a molar mass of up to 1.5 times that of the compounds with a small molar mass.

4. A process as claimed in claim 1, wherein the fraction enriched in compounds having a small molar mass has a content of the same over 1.1 times, that of the starting solution, based on the dry substance content.

5. A process as claimed in claim 4, wherein the fraction enriched in compounds having a small molar mass has a content of the same of 1.5 to 3.5 times that of the starting solution, based on the dry substance content.

6. A process as claimed in claim 1, wherein the fraction enriched in compounds with a small molar mass is recovered as the nanofiltration permeate.

7. A process as claimed in claim 6, wherein the fraction enriched in compounds with a molar mass higher than but less than 1.9 times that of the compounds with a small molar mass is recovered as the nanofiltration retentate.

8. A process as claimed in claim 1, wherein the fraction enriched in compounds with a small molar mass is recovered as the nanofiltration retentate.

9. A process as claimed in claim 8, wherein the fraction enriched in compounds with a molar mass higher than but less than 1.9 times that of the compounds with a small molar mass is recovered as the nanofiltration permeate.

10. A process as claimed in claim 1, wherein the compounds with a small molar mass are selected from sugars, sugar alcohols, inositols, betaine, cyclodextrins, amino acids, uronic acids and carboxylic acids.

11. A process as claimed in claim 10, wherein the compounds with a small molar mass comprise pentose sugars and compounds with a molar mass higher than but less than 1.9 times that of the compounds with a small molar mass comprise hexose sugars.

12. A process as claimed in claim 11, wherein said pentose sugars comprise xylose and arabinose and said hexose sugars comprise glucose, galactose, rhamnose and mannose.

13. A process as claimed in claim 11, wherein the fraction enriched in pentose sugars is recovered as the nanofiltration permeate and the fraction enriched in hexose sugars is recovered as the nanofiltration retentate.

14. A process as claimed in claim 10, wherein the compound with a small molar mass is selected from xylitol and the compound with a molar mass higher than but less than 1.9 times that of the compound with a small molar mass is selected from sorbitol.

15. A process as claimed in claim 14, wherein the fraction enriched in xylitol is recovered as the nanofiltration permeate and the fraction enriched in sorbitol is recovered as the nanofiltration retentate.

16. A process as claimed in claim 10, wherein the compound with a small molar mass is selected from betaine and the compound with a molar mass higher than but less than 1.9 times that of the compounds with a small molar mass is selected from erythritol.

17. A process as claimed in claim 10, wherein the compound with a small molar mass is selected from betaine and compounds with a molar mass higher than but less than 1.9 times that of the compounds with a small molar mass are selected from glucose and inositol.

18. A process as claimed in claim 1 wherein the starting solution comprises a biomass hydrolysate or a biomass extract.

19. A process as claimed in claim 1, wherein the fraction enriched in compounds with a molar mass higher than but less than 1.9 times that of the compounds with a small molar mass is further enriched in divalent ions.

20. A process as claimed in claim 19, wherein the fraction enriched in compounds with a molar mass higher than but less than 1.9 times that of the compounds with a small molar mass is further enriched in compounds with a molar mass of 1.9 to 4 times that of the compounds with a molar mass and compounds with a molar mass over 4 times that of the compounds with a small molar mass.

21. A process as claimed in claim 1, wherein the starting solution has been subjected to one or more pretreatment steps.

22. A process as claimed in claim 21, wherein the pretreatment steps are selected from ion exchange, ultrafiltration, chromatography, concentration, pH adjustment, filtration, dilution, crystallization and combinations thereof.

23. A process as claimed in claim 1, wherein the starting solution has a dry substance content of 3 to 50% by weight.

24. A process as claimed in claim 1, wherein the starting solution has a content of the compounds with a small molar mass of 5 to 95%, based on the dry substance content.

25. A process as claimed in claim 1, wherein the starting solution used as the nanofiltration feed has a dry substance content less than 30% by weight.

26. A process as claimed in claim 1, wherein nanofiltration is carried out a pH of 1 to 12.

27. A process as claimed in claim 1, wherein nanofiltration is carried out at a pressure of 10 to 50 bar.

28. A process as claimed in claim 1, wherein nanofiltration is carried out at a temperature of 5 to 95° C.

29. A process as claimed in claim 1, wherein the nanofiltration is carried out with a flux of 2 to 100 liters/$m^2$ h.

30. A process as claimed in claim 1, wherein nanofiltration is carried out using a nanofiltration membrane selected from polymeric and inorganic membranes having a cut-off size of 100 to 2500 g/mol.

31. A process as claimed in claim 30, wherein the cut-off size of the nanofiltration membrane is 150 to 1000 g/mol.

32. A process as claimed in claim 31, wherein the cut-off size of the nanofiltration membrane is 150 to 500 g/mol.

33. A process as claimed in claim 30, wherein the nanofiltration membrane is selected from ionic membranes.

34. A process as claimed in claim 30, wherein the nanofiltration membrane is selected from hydrophilic membranes.

35. A process as claimed in claim 30, wherein the nanofiltration membrane is selected from hydrophobic membranes.

36. A process as claimed in claim 30, wherein the nanofiltration membrane is selected from cellulose acetate membranes, polyethersulfone membranes, sulfonated polyether sulphone membranes, polyester membranes, polysulfone membranes, aromatic polyamide membranes, polyvinyl alcohol membranes and polypiperazine membranes and combinations thereof.

37. A process as claimed in claim 36, wherein the nanofiltration membrane is selected from sulfonated polyether sulfone membranes and polypiperazine membranes.

38. A process as claimed in claim 36, wherein the nanofiltration membrane is selected from a polypiperazine membrane having a cut-off size of 200 g/mol, permeability (25° C.) of 7–8 l/($m^2$ h bar), NaCl-retention of 70%; a four-layered membrane consisting of a polyester layer, a polysulfone layer and two proprietary layers, having a cut-off size of 150 to 300 g/mol, permeability (25° C.) of 5.4 l/($m^2$ h bar) and $MgSO_4$-retention of 98% (2 g/l); a membrane consisting of aromatic polyamide, having a permeability (25° C.) of 4.8 l/($m^2$ h bar), NaCl-retention of 45%; and a sulfonated polyethersulfone membrane having a cut-off size of 500 to 1000 g/mol, permeability (25° C.) of 9.4 l/($m^2$ h bar) and NaCl-retention of 51% (5 g/l).

39. A process as claimed in claim 30, wherein the form of the nanofiltration membrane is selected from sheets, tubes, spiral membranes and hollow fibers.

40. A process as claimed in claim 1, wherein the nanofiltration is carried out with a nanofiltration membrane that has been pretreated by washing.

41. A process as claimed in claim 40, wherein the washing agent is selected from ethanol and/or an alkaline detergent.

42. A process as claimed in claim 1, wherein the nanofiltration process is repeated at least once.

43. A process as claimed in claim 1, wherein the process is carried out batchwise or continuously.

44. A process as claimed in claim 1, wherein the process is carried out using a nanofiltration equipment including several nanofiltration elements arranged in parallel or series.

45. A process as claimed in claim 1, wherein the process also comprises one or more post-treatment steps.

46. A process as claimed in claim 45, wherein the post-treatment steps are selected from ion exchange, crystallization, chromatography, concentration and colour removal.

47. A process as claimed in claim 1 for separating xylose from a biomass hydrolysate, comprising subjecting said biomass hydrolysate to nanofiltration and recovering as the nanofiltration permeate a solution enriched in xylose.

48. A process as claimed in claim 47, wherein the dry substance content of the starting solution is 3 to 50% by weight.

49. A process as claimed in claim 47, wherein the starting solution has a xylose content of 5 to 95%, based on the dry substance content.

50. A process as claimed in claim 47, wherein the nanofiltration is carried out at a pH of 1 to 7.

51. A process as claimed in claim 47, wherein nanofiltration is carried out at a temperature of 5 to 95° C.

52. A process as claimed in claim 47, wherein the starting solution is a spent liquor obtained from a pulping process.

53. A process as claimed in claim 52, wherein the spent liquor obtained from a pulping process is a spent sulphite pulping liquor.

54. A process as claimed in claim 47, wherein the process comprises a further step of recovering a solution enriched in lignosulphonates, hexose sugars, oligosacharides and divalent salts as the retentate.

55. A process as claimed in claim 47, wherein the starting solution has a xylose content of 15 to 55%, based on the dry substance content.

56. A process as claimed in claim 1 for separating betaine from a biomass extract, comprising subjecting said biomass extract to nanofiltration and recovering a fraction enriched in betaine.

57. A process as claimed in claim 56, wherein the fraction enriched in betaine is recovered as the nanofiltration permeate.

58. A process as claimed in claim 56, wherein the fraction enriched in betaine is recovered as the nanofiltration retentate.

59. A process as claimed in claim 56, wherein the biomass extract is sugar beet pulp extract.

60. A process as claimed in claim 1 for separating one or more amino acids from betaine, comprising providing a starting solution comprising betaine and one or more amino acids, subjecting said solution to nanofiltration to obtain a fraction enriched in betaine and a fraction enriched in one or more amino acids, recovering the fraction enriched in betaine, and recovering the fraction enriched in one or more amino acids.

61. A process as claimed in claim 60, wherein said one or more amino acids are selected from leucine, isoleucine, serine, proline and valine.

62. A process as claimed in claim 1 for separating one or more amino acids from a biomass hydrolysate or a biomass extract, comprising subjecting said biomass hydrolysate or biomass extract to nanofiltration and recovering a fraction enriched in one or more amino acids.

63. A process as claimed in claim 1 for separating carboxylic acids from one or more monosaccharides, comprising providing a starting solution comprising carboxylic acids and one or more monosaccharides, subjecting said solution to nanofiltration to obtain a fraction enriched in carboxylic acids and a fraction enriched in one or more monosaccharides, recovering the fraction enriched in one or more monosaccharides, and optionally recovering the fraction enriched in carboxylic acids.

64. A process as claimed in claim 63, wherein said one or more monosaccharides are selected from ketose sugars.

65. A process as claimed in claim 64, wherein said ketose sugars are selected from tagatose.

66. A process as claimed in claim 1, wherein the compounds with a small molar mass have a molar mass of up to 200 g/mol.

* * * * *